United States Patent
Choubak et al.

(10) Patent No.: US 11,262,769 B2
(45) Date of Patent: Mar. 1, 2022

(54) REAL-TIME QUALITY MONITORING OF BEVERAGE BATCH PRODUCTION USING DENSITOMETRY

(71) Applicant: PepsiCo, Inc., Purchase, NY (US)

(72) Inventors: Saman Choubak, Larchmont, NY (US); Badreddine Ahtchi-Ali, Montebello, NY (US)

(73) Assignee: PepsiCo, Inc., Purchase, NY (US)

( * ) Notice: Subject to any disclaimer, the term of this patent is extended or adjusted under 35 U.S.C. 154(b) by 312 days.

(21) Appl. No.: 15/793,398

(22) Filed: Oct. 25, 2017

(65) Prior Publication Data

US 2019/0121374 A1 Apr. 25, 2019

(51) Int. Cl.
*G05D 11/13* (2006.01)

(52) U.S. Cl.
CPC ......... *G05D 11/137* (2013.01); *G05D 11/132* (2013.01)

(58) Field of Classification Search
CPC .......................... G05D 11/137; G05D 11/132
See application file for complete search history.

(56) References Cited

U.S. PATENT DOCUMENTS

| | | | |
|---|---|---|---|
| 5,706,661 A | 1/1998 | Frank | |
| 6,186,193 B1 * | 2/2001 | Phallen | B65B 3/30 141/100 |
| 6,374,845 B1 | 4/2002 | Melendez et al. | |
| 8,460,733 B2 * | 6/2013 | Wu | A23L 2/46 141/89 |
| 2003/0121937 A1 | 7/2003 | Black et al. | |
| 2005/0193832 A1 * | 9/2005 | Tombs | G01F 1/74 73/861 |

(Continued)

FOREIGN PATENT DOCUMENTS

WO 2017186364 A1 11/2017

OTHER PUBLICATIONS

Julie Valentine and Pamela Quilin, Emerson Process Management, USA, "discuss the best practices for using Coriolis flowmeter in sulfuric acid and alkylation units". Hydrocarbon Engineering, Jan. 2008, pp. 53-56.

(Continued)

*Primary Examiner* — Anthony J Weier
(74) *Attorney, Agent, or Firm* — Sterne, Kessler, Goldstein & Fox P.L.L.C.

(57) ABSTRACT

Aspects of the disclosure include a method for tracking the quality of a beverage produced according to a batch process that includes adding ingredients to water to form a batch, measuring the density of the batch in real time using an in-line density device, monitoring changes in density of the batch, detecting deviations from the batch process based on the changes in density, and correcting for any detected deviations from the batch process in real time. Other aspects of the disclosure relate to a method of detecting inhomogeneity in real time for a batch process for producing a beverage. Other aspects of the disclosure include a method of tracking addition of ingredients for producing a beverage in a batch process includes sequentially adding a plurality of ingredients to water according to a standard recipe to form a batch and correcting for any detected deviations from the recipe in real time.

20 Claims, 12 Drawing Sheets

(56) References Cited

U.S. PATENT DOCUMENTS

2006/0235629 A1 10/2006 Walker et al.
2017/0197817 A1 7/2017 Nachawati et al.

OTHER PUBLICATIONS

J.A. Weinstein, D.R. Kassoy, and M. J. Bell. "Experimental study of oscillator motion of particles and bubbles with applications to Coriolis flow meters". Physics of Fluids 20, 103306, (Oct. 2008).
Joel Weinstein, Emerson Process Management, Micro Motion, Inc. "Multiphase Flow in Coriolis Mass Flow Meters—Error Sources and Best Practices". 28th International North Sea Flow Measurement Workshop, Oct. 26-29, 2010.
Tom O'Banion, Emerson Process Management, Micro Motion Div. "Coriolis: The Direct Approach to Mass Flow Measurement". American Institute of Chemical Engineers (AIChE), Mar. 2013, pp. 41-46.
International Search Report and Written Opinion of the International Searching Authority issued in International Application No. PCT/US2021/017891, dated Apr. 22, 2021, 7 pages.
International Search Report and Written Opinion of the International Searching Authority issued in International Application No. PCT/US2018/056936, dated Jan. 15, 2019, 7 pages.

* cited by examiner

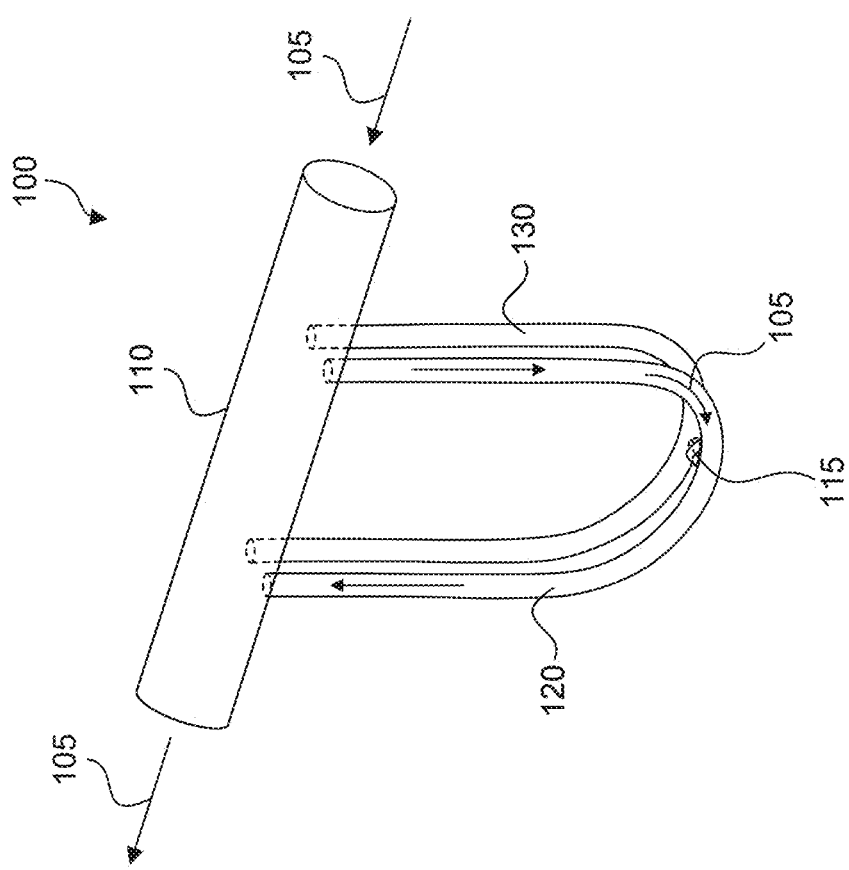

REAL-TIME QUALITY MONITORING OF BEVERAGE BATCH PRODUCTION USING DENSITOMETRY

BACKGROUND

Field of the Invention

The described embodiments relate generally to a batch process for producing a beverage, including measuring characteristics of the batch process in real time.

BRIEF SUMMARY

Aspects of the disclosure include a method for tracking the quality of a beverage produced according to a batch process. The batch process may include adding ingredients to water to form a batch. A first ingredient may be added, then the batch may be mixed until the first ingredient is fully mixed, then a second ingredient may be added, and the batch may be mixed until the second ingredient is fully mixed. Additionally, the method may include measuring the density of the batch in real time using an in-line density device, monitoring changes in density of the batch, detecting deviations from the batch process based on the changes in density, and correcting for any detected deviations from the batch process in real time. The method may also include comparing the density measurements to a standard beverage recipe and matching the density measurements to the standard beverage recipe.

In other aspects of the disclosure, a method of detecting inhomogeneity in a batch process for producing a beverage may include mixing ingredients to form a batch, measuring drive gain of the batch in real time, monitoring changes in the drive gain, detecting inhomogeneity in the batch based on the changes in the drive gain, and correcting for any detected inhomogeneity from the batch process in real time.

In other aspects of the disclosure, a method of tracking addition of ingredients for producing a beverage in a batch process may include sequentially adding ingredients to water according to a recipe to form a batch, measuring the density of the batch in real time using an in-line density device, monitoring changes in density of the batch after each ingredient is added to the batch, detecting deviations from the standard recipe, and correcting for any detected deviations from the batch process in real time.

BRIEF DESCRIPTION OF THE DRAWINGS/FIGURES

FIG. 2A shows the exemplary in-line density device.

DETAILED DESCRIPTION

Figure 1:
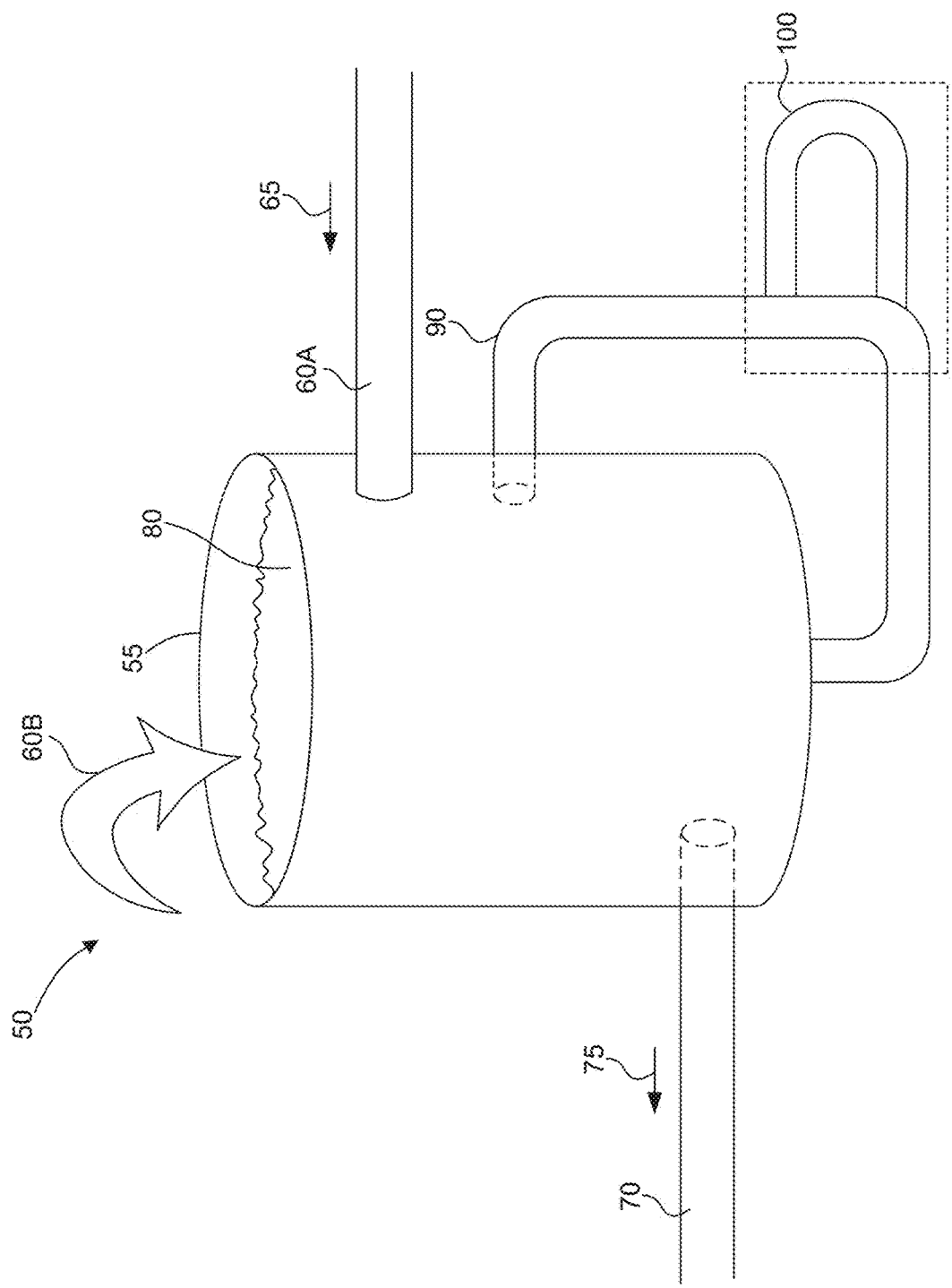
FIG. 1 shows an exemplary beverage-creation batch process system with an in-line density device attached to a recirculation loop.

Many pre-packaged beverages are made industrially using batch processes that follow complex recipes. For example, a recipe may provide instructions to add multiple ingredients into a big vat of water, one after another in varying amounts, and to ensure that each ingredient is fully mixed or that enough time has passed before adding another ingredient. These recipes often require a large number of ingredients, including liquids with different viscosities or solids (e.g., powders), each of which may dissolve at a different rate. Often these ingredients are added manually by operators who visually determine whether the ingredient is fully mixed. Oftentimes, the beverage formulas or recipes are very complex and include hard-to-dissolve solids. This makes it especially challenging to monitor product quality in-line.

Relying on manual addition of ingredients and visual inspection of mixtures leaves room for potential errors in the batch process. For example, an operator may add the wrong amount of an ingredient, leave an ingredient out of the batch entirely, or prematurely move on or complete the batch before an ingredient is fully mixed. It is difficult to track and quantify the amount of ingredients added and the quality of mixing while the ingredients are being mixed. Thus, an analysis of the batch is often necessary after completion of the process, to ensure it meets standards.

Once the batch has been completed, however, it can be costly, and sometimes impossible, to correct any errors, and in some cases the entire batch must be discarded. This results in wasted time, money, and materials. In addition to these potential operator errors, each individual beverage-making facility may use different equipment and inputs of varying quality sourced from different suppliers, potentially resulting in varying batch quality, or the need for facility-specific quality-control measures. Thus, in-line analysis of the batch can be helpful in measuring and tracking ingredients added during a batch process and in promoting consistent batch quality among various manufacturing facilities.

An in-line density device may be used to monitor batch characteristics in real time, so that errors can be corrected in real time, or avoided altogether. In-line density devices, which may include components such as a flowmeter and a densitometer, can be used to continuously measure density, flow rate, and other characteristics to deduce ingredient concentrations in the batch. Unlike existing analysis methods that use off-line analysis of the batch, in-line density devices may be used to continuously monitor and quantify the batch as ingredients are added. The device and method may also be used to identify batch characteristics that can be used to determine a specific standard that is unique to each beverage recipe. By continuously measuring characteristics of the batch, the in-line density device can aid in evaluation of the batch against the ideal "gold standard" batch (e.g., a target recipe") characteristics and make adjustments in real-time to avoid issues such as incomplete mixing, inconsistent batch quality, and other problems.

FIG. 1 shows an exemplary batch system 50 for producing a beverage. Batch system 50 may include a mixing tank 55, an ingredient inlet 60, an outlet 70, a batch 80, and a recirculation loop 90. Ingredients flow into mixing tank 55 through ingredient inlet 60 in the direction of arrow 65. Once in mixing tank 55, the ingredients are mixed to form batch 80, which continuously flows through recirculation loop 90. As batch 80 flows through recirculation loop 90, in-line density device 100 measures the density and mass flow rate of batch 80. Once batch 80 is complete, batch 80 may flow out of mixing tank 55 through outlet 70 in the direction of arrow 75, to be further processed (e.g., packaged into bottles or other containers).

Ingredients may be manually added to mixing tank 55 through ingredient inlet 60A or by being poured over the top of mixing tank 55 (e.g., in the direction of arrow 60B). Existing methods monitor batch quality after the batch has been mixed in mixing tank 55 and leaves through outlet 70. These methods use offline testing with laboratory equipment. These methods cannot measure the batch quality in real time or continuously during the batch-creation process. In contrast, using recirculation loop 90 and in-line density device 100, the density of batch 80 may be measured in real time. As batch 80 is being processed, in-line density device 100 may continuously measure the density of batch 80, and the measurements returned can be used to determine the quality of batch 80, including whether batch 80 conforms to a standard recipe and whether ingredients are fully mixed into batch 80. In-line density device 100 may provide density measurements as precise as the offline density device, or within a small margin of error. In some embodiments, the in-line density device provides measurements that are within a 0.001%, 0.005%, 0.01%, 0.02%, 0.05%, 0.1%, 0.5%, 1%, or 5% margin of error.

Figure 2B:
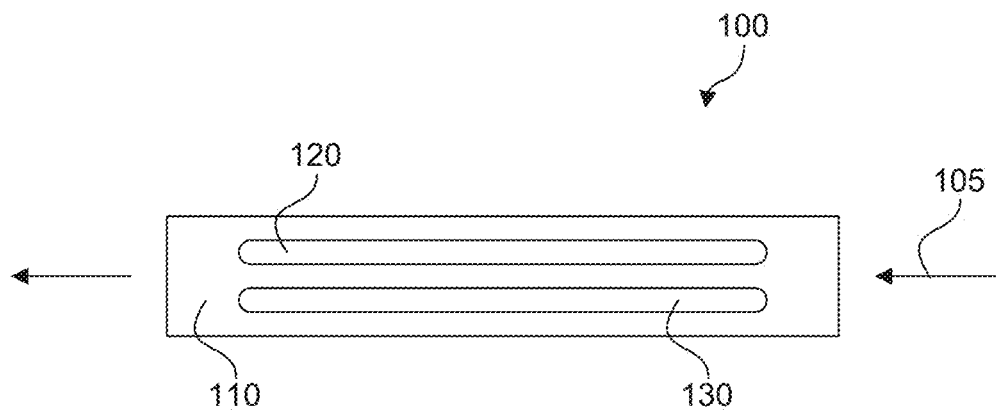
FIG. 2B shows a bottom-up view of the in-line density device of FIG. 2A.
Figure 2C:
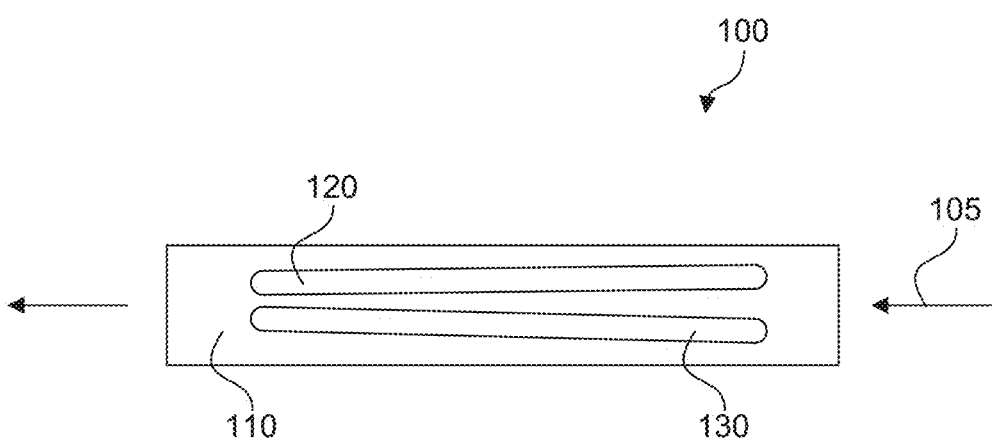
FIG. 2C shows a bottom-up view of the in-line density device of FIG. 2A that is oscillating due to fluid flowing through the device.

FIGS. 2A-2C show an exemplary in-line density device 100. In some embodiments, in-line density device 100 is a Coriolis density meter. FIGS. 2B and 2C show a bottom-up view of in-line density device 100 of FIG. 2A. In-line density device 100 includes a tube 110 (e.g., part of recirculation loop 90), a first flow tube 120, and a second flow tube 130. To measure density and mass flow rate using in-line density device 100, the batch enters first flow tube 120 and second flow tube 130. Each of the flow tubes 120 and 130 may have a magnet and coil assembly 115, and as the batch passes through flow tubes 120 and 130, Coriolis forces may be induced, which causes flow tubes 120 and 130 to twist in opposition to one another. Coriolis density meters are equipped with sensors that can measure the twisting of flow tubes 120 and 130 and directly measure the density and mass flow rate.

FIGS. 2A and 2B show the position of flow tubes 120 and 130 without any fluid flowing through in-line density device 100. FIG. 2C shows exemplary positions of flow tubes 120 and 130 with fluid flowing through in-line density device 100. Fluid flows through in-line density device 100 in the direction of arrows 105. Flow tubes 120 and 130 both oscillate as fluid flows through the tube, and the rate at which mass flows through the tubes affects the oscillation of the tubes. The magnet and coil assembly creates a voltage in the form of sine waves as fluid flows through tubes 120 and 130.

Additionally, a densitometer, such as a Coriolis density meter, registers spikes in density when air bubbles and undispersed powders are present in the system. This is due to changes in the location of the center of gravity of the fluid inside the tube, also known as "drive gain." Drive gain shows a small but detectable spike when there are two phases (e.g., solid and liquid) present in the system.

The response of the drive gain depends on the decoupling of the solids from the liquid. This phenomenon can be used as another indication of inhomogeneity in the mixture or changes in viscosity or product microstructure.

Additionally, the presence of air bubbles and particles in the flow is known to cause measurement errors, referred to as decoupling or multiphase error. Decoupling refers to the relative motion between two ingredients of differing density in the direction of the tube oscillation, which is perpendicular to the direction of the bulk fluid flow.

Figure 3:
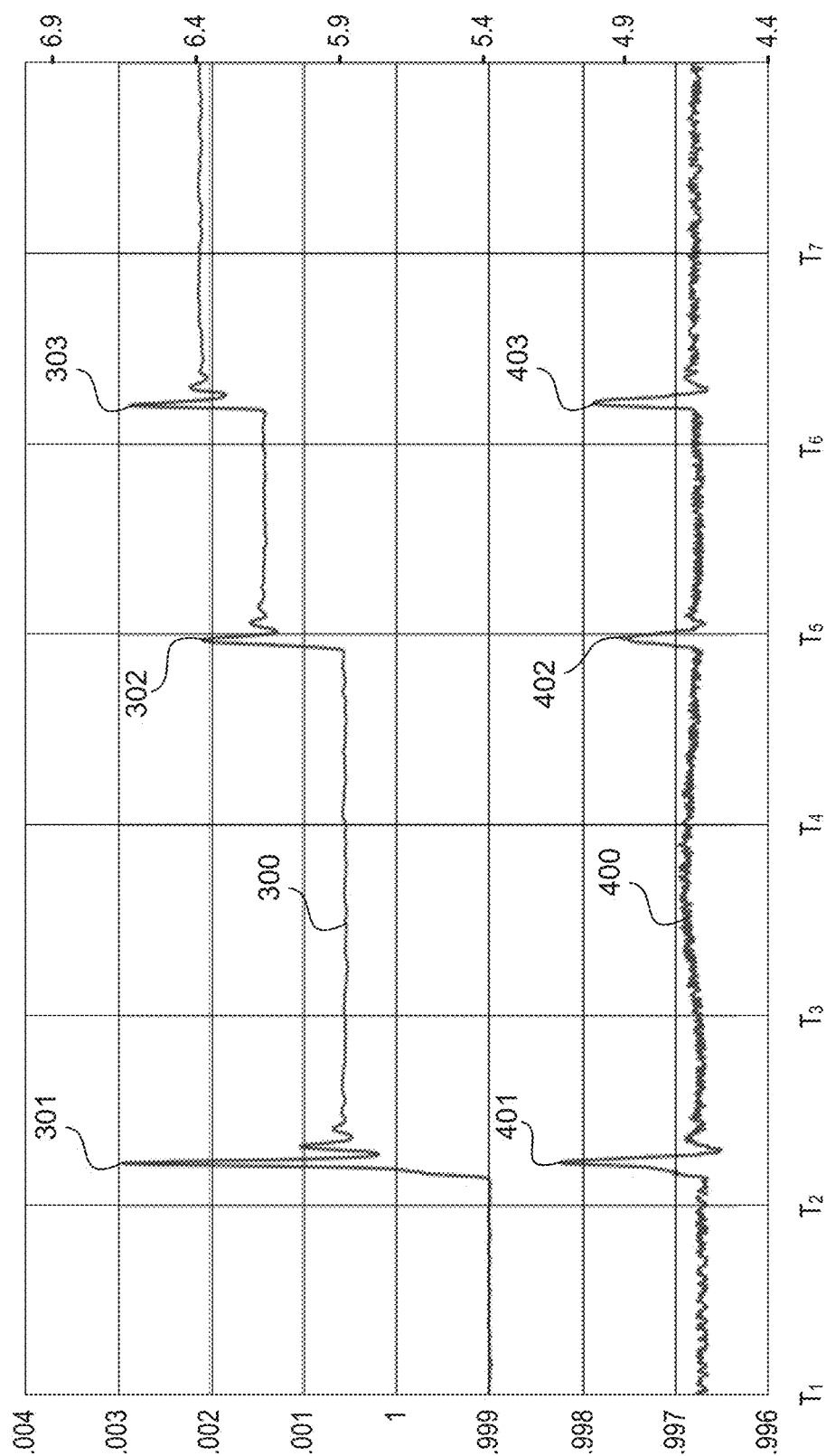
FIG. 3 shows an exemplary graph produced based on readings from the in-line density device.

FIG. 3 illustrates an exemplary output of measurements by in-line density device 100. Line 300 shows the density of the batch over time, and line 400 shows the drive gain of the batch over time. As shown in FIG. 3, the density spikes, shown by peaks 301, 302, and 303, and levels out higher each time an ingredient is added. Similarly, the drive gain spikes, shown by peaks 401, 402, and 403, each time an ingredient is added. Following the spikes, line 400 shows a reduction in the drive gain back to the value before the ingredient was added. This return to the lower value indicates the added ingredient has been well-mixed into batch 80 such that batch 80 is homogenous.

Figure 4B:
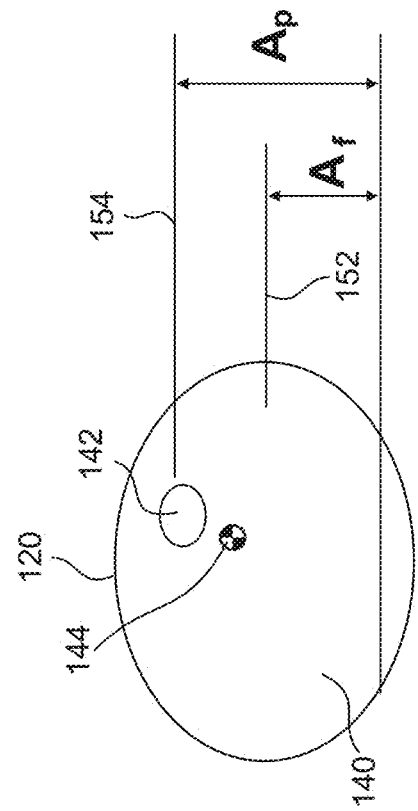
FIG. 4B shows a cross-section of a tube with two phases flowing through the tube.
Figure 4A:
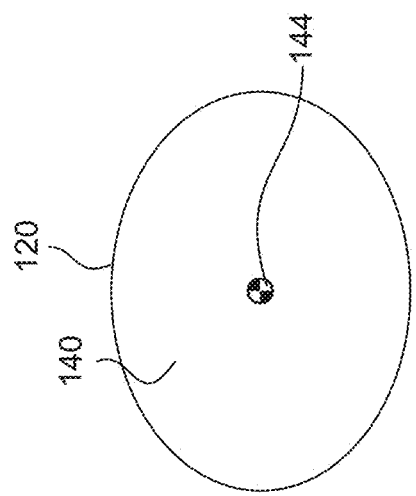
FIG. 4A shows a cross-section of a tube with a single phase of fluid flowing through the tube.

FIG. 4A illustrates a single phase, a first phase 140, flowing through first flow tube 120. FIG. 4B illustrates two phases, first phase 140 and a second phase 142, flowing through first flow tube 120. First phase may be liquid (e.g., the homogenous portion of batch 80) and second phase may be solid (e.g., a newly-introduced ingredient that has not yet been well-mixed into batch 80. It is to be understood that more than two phases are possible, and similar flow occurs in second flow tube 130. The center of gravity, shown by circle 144, is in the center of first flow tube 120 when there is one phase present, as in FIG. 4A. As shown in FIG. 4B, the center of gravity, shown by circle 144, is no longer in the center of first flow tube 120, which can cause fluid mass to appear lighter than it really is. The ratio of $A_p/A_f$, which is the ratio of the amplitude of particle oscillation $(A_p)$ to the amplitude of fluid oscillation $(A_f)$ is the decoupling ratio. Line 152 represents $A_f$ and line 154 represents $A_p$.

Figure 5:
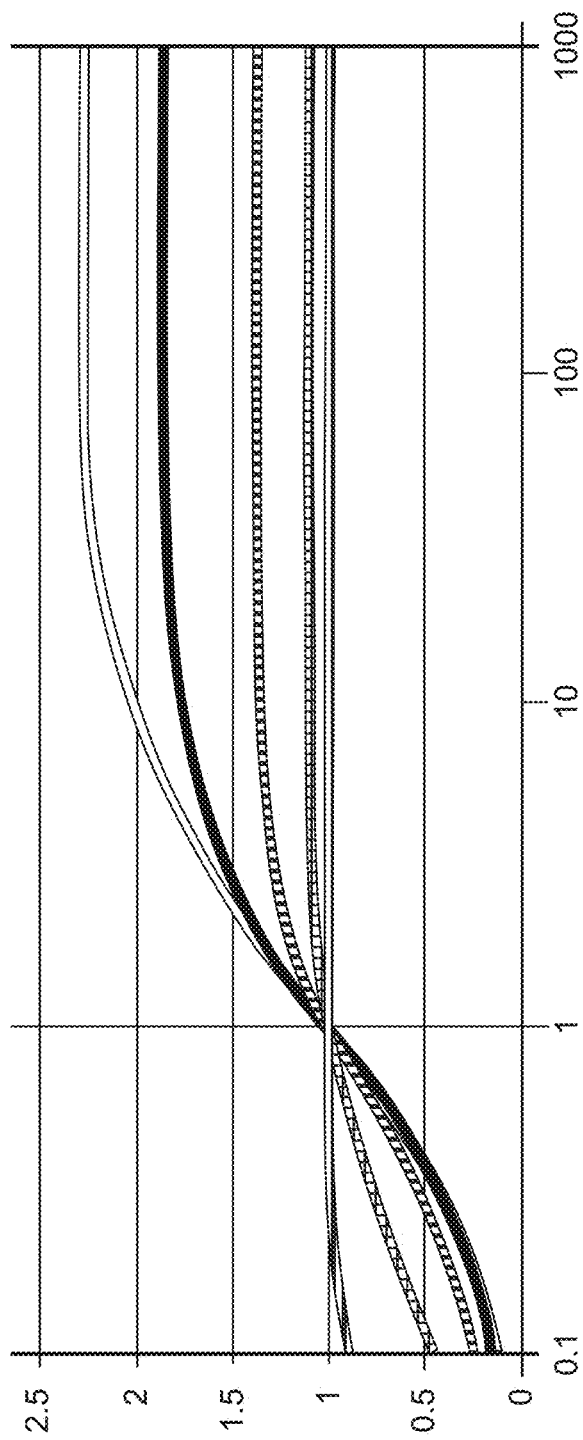
FIG. 5 shows a chart of decoupling ratio versus density ratio of an exemplary batch.

FIG. 5 shows decoupling results for various solids. The y-axis is decoupling ratio $(A_p/A_f)$, and the x-axis is density ratio (fluid density/particle density). A decoupling ratio of 1 indicates that the center of gravity of the fluid and the center of gravity of the tube are moving in sync. Decoupling ratios above and below 1 indicate that a particle is present that is skewing the centers of mass. Errors in density measurements are minimized as the decoupling ratio approaches 1.

Batch Quality

Using an in-line density device, such as the one described above, it is possible to measure and track certain characteristics of a batch process, which can enable ready determination of the quality of the batch. For example, in some embodiments, an "ideal" batch can be produced in a batch process (i.e., a "target recipe," a "standardized process," a "standard beverage recipe," or a "gold standard"). During the production of the "ideal" batch, the in-line density device can continuously track and monitor, in real time, the density and the drive gain of the batch. During the batch process, or following the completion of the batch, the in-line density device can provide target recipe data such as that shown in FIGS. 6-10. This target recipe data can provide a standardized reference for reproducing that same "ideal" batch.

Using this standardized process, it is possible to set certain parameters or tolerances for error in the batch (e.g., pass/fail criteria). If the in-line density device detects density levels within the parameters or tolerances, then the batch "passes." If the in-line density device detects density levels outside of the parameters or tolerances, then the batch "fails" and the in-line density device may provide an alert or notification that the batch has deviated from the standardized process. For example, in some embodiments, if the in-line density device detects density levels that deviate more than 1% from the expected value, the device may provide an alert. In some embodiments, if the in-line density device detects density levels that deviate more than 1%, 5%, 10/o, or 15%, then the device will provide an alert.

Additionally, in-line density device 100 may be in communication with a software that measures the drive gain, measures the density, monitors changes in the density of the batch in real time, and detects deviations of the density from a target recipe. The software may also provide an alert based on the tolerances discussed above. The software may provide the alert automatically if deviations from the target recipe are detected. For example, the software may provide an alert if the software detects a deviation of at least 1% from the target recipe. The software may also provide an automatic alert when the drive gain increases, indicating inhomogeneity in the batch, or when the drive gain returns to a steady state or expected value. The software may also be in communication with a mixer of mixing tank 55 to automatically mix batch 80 if an increase in drive gain is detected.

The batch process begins with adding water to mixing tank 55. Water may be considered the first ingredient in batch 80. Mixing tank 55 may have a capacity of greater than 5 gallons, for example (e.g., greater than 30, 90, or 500 gallons as may be used in industrial beverage production). After the water is added, the water flows through recirculation loop 90 and in-line density device 100, such as a densitometer, measures the density of the water. In some embodiments, in-line density device 100 is a Coriolis density meter. Following the measurement of the density of the water, ingredients may be added to batch 80. The ingredients may be liquids, solids, or gases. Batch 80 may continuously flow through recirculation loop 90, and in-line density device 100 may continuously measure the density of batch 80. In some embodiments, the ingredients are added sequentially, and the density is measured continuously. The inline densitometer reads the density instantaneously. The density measurements during ingredient addition are monitored in real time through graphic display. Subsequent ingredients may be added after density fluctuations from previous addition plateau to constant density value. The density may be measured for less than 1 second, at least 1 second, at least 30 seconds, at least 1 minute, at least 2 minutes, at least 3 minutes, at least 4 minutes, or at least 5 minutes. The density may also be measured until the output reading from in-line density device 100 indicates that batch 80 sufficiently matches the target recipe data, or until the drive gain reading indicates that batch 80 is well-mixed. Additionally, the measured density may be compared continuously to the density of the target recipe data, and any deviations cause an alert or notification as described above.

Deviations from the target recipe data can also be corrected in real time. For example, if the density measurements indicate an ingredient is missing or present in an incorrect amount, more of the ingredient can be added, the batch can be diluted, or other combinations of ingredients can be added to bring the batch back within acceptable specifications. For example, if the deviation indicates there is too little of an ingredient, additional amounts of the ingredient may be added until the density meets the target recipe data. Also for example, if the deviation indicates there is too much of an ingredient, additional water may be added to the batch, and any other ingredient amounts may be increased until the density meets the target recipe data. The drive gain may be measured in real time and continuously, and the process may provide an alert or notification to any drive gain readings that indicate inhomogeneity.

Following the addition of each ingredient, the drive gain is also measured (e.g., simultaneously with the density), which determines whether batch 80 is in a single- or multi-phase. If the drive gain indicates there is inhomogeneity (e.g., batch 80 is in multi-phase), this provides an opportunity to correct for such inhomogeneity in real time. For example, if the drive gain indicates there are undissolved solids, agglomeration, changes in viscosity, or gases present, batch 80 may be further mixed until the drive gain returns to a value that indicates a homogenous or well-mixed mixture. The drive gain measurements may also be used to detect changes in the viscosity or product microstructure, which may be corrected in real time by, for example, the addition of further ingredients.

The process may provide certain tolerances for changes in the drive gain and may provide an alert or notification if the changes in the drive gain exceed those tolerances, so that corrective action can be taken as warranted. In some embodiments, the process will provide an alert if the drive gain changes more than 1%, 2%, 5/%, or 10%. Following such an alert, the system may automatically mix the batch until the drive gain is reduced to a level that indicates a homogeneous or well-mixed mixture. For example, the system may measure the drive gain of water only as a baseline, before any ingredients have been added, then after each ingredient is added it may then mix the batch until the drive gain is reduced to within ±1% of the baseline drive gain of water only.

In some embodiments, the process for measuring density and drive gain of the batch process may be used to align various production facilities that use different equipment and inputs of varying quality sourced from different suppliers, resulting in the potential for varying batch characteristics attributable to their varying ingredients, equipment, and processes. By providing an objective quantitative standard against which batch characteristics can be measured in real time, such disparate facilities can more easily output consistent product. In some embodiments, the process may be used for facility-specific quality-control measures. By creating a standardized recipe or batch as described above, various facilities can use this process to readily determine whether subsequent batches meet quality standards.

It is also possible to use this process on existing equipment by retrofitting the equipment with the in-line density device. For example, the in-line density device can be added to an existing production process without requiring significant modifications or equipment down time. An existing batch process or equipment for producing a beverage can be modified by adding a recirculation loop with an in-line density device to measure density and to an existing batch process. FIG. 1 illustrates an exemplary system 50 with recirculation loop 90 and in-line density device 100 that could be added to retrofit and existing system.

The following examples illustrate how this method can be used to measure density and homogeneity in a batch process for making a beverage. The examples show how the measurements are made, how the measurements can be compared either to a standard recipe or to other processes producing the same beverage. Additionally, the examples show that this method can detect even slight changes in density or homogeneity that may affect batch quality. These examples further illustrate that this method can produce measurement results with nearly the same precision as a more complex, off-line density measurement apparatus and method.

Example 1

Figure 6:
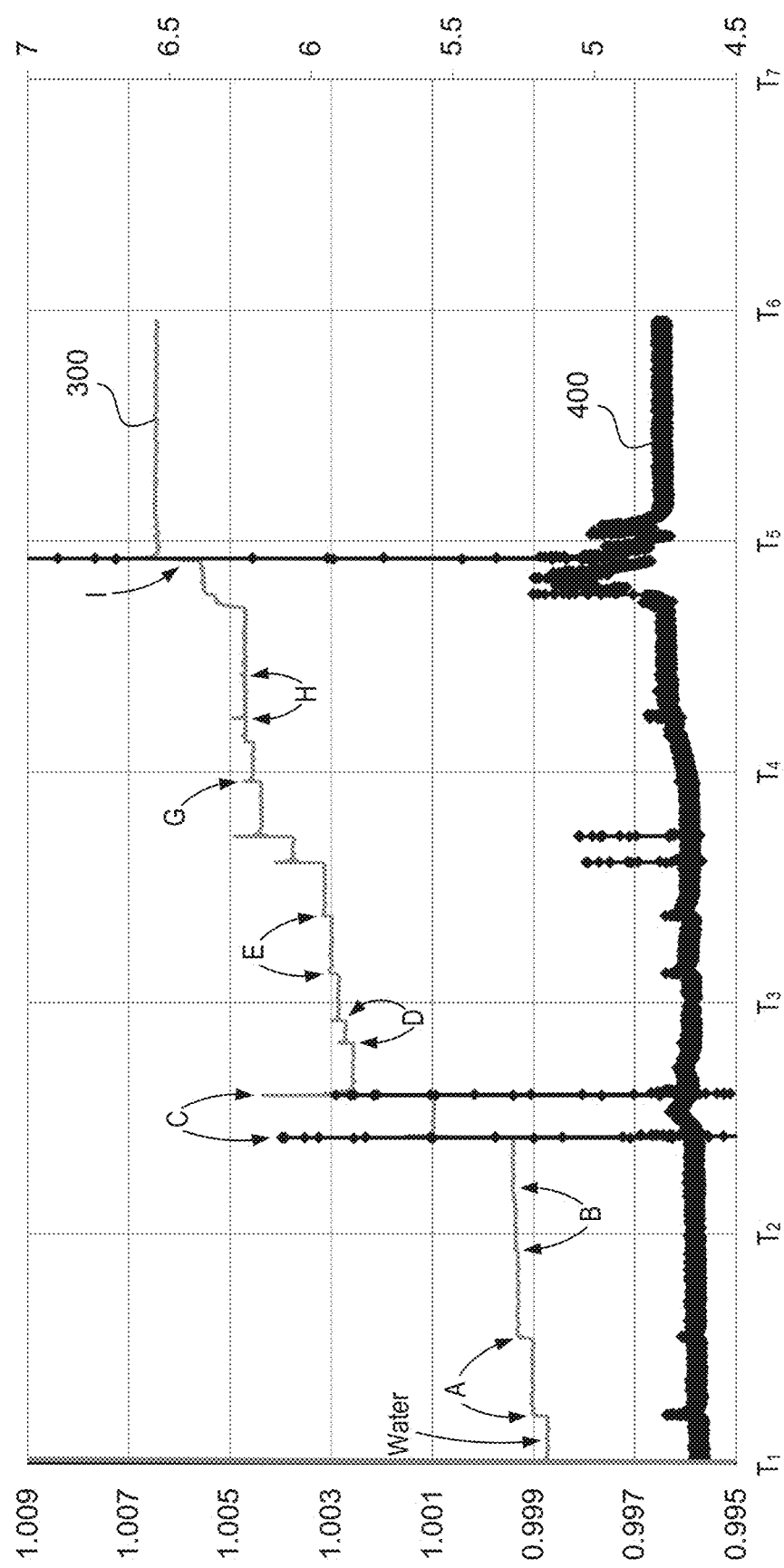
FIG. 6 shows density and drive gain measurements over time for another exemplary batch.

One experiment tested the production of two different batches of syrup ("Batch 1" and "Batch 2"), beginning with about 40 gallons of water. Ingredients A, B, C, D, E, F, G, H, and I were added in sequence. Table 1 shows the sequence and mass of ingredients added to Batch 1 and Batch 2. So, for example, Ingredient A was added to the batch at two different times, in a total amount of 266 grams, and Ingredient G was added to Batch 1 once and to Batch 2 twice, in a total amount of 144 grams for each batch. FIG. 6 shows the density and drive gain of Batch 1 over time. The left y-axis shows density (g/cm$^3$), the right y-axis shows drive gain, and the x-axis shows time (seconds). Line 300 represents the density of the batch over time, and line 400 represents drive gain over time.

TABLE 1

| Sequence | Ingredient | Mass added to Batch 1 (grams) | Mass added to Batch 2 (grams) |
| --- | --- | --- | --- |
| 1 | Water | 150969 | 150969 |
| 2 | A | 133 | 133 |
| 3 | A | 133 | 133 |
| 4 | B | 14 | 14 |
| 5 | B | 14 | 14 |
| 6 | C | 579 | 386 |
| 7 | C | 579 | 386 |
| 8 | C | 0 | 386 |
| 9 | D | 47 | 0 |
| 10 | D | 47 | 0 |
| 11 | E | 84 | 84 |
| 12 | E | 84 | 84 |
| 13 | F | 236 | 236 |
| 14 | F | 236 | 236 |
| 15 | G | 144 | 72 |
| 16 | G | 0 | 72 |
| 17 | H | 130 | 130 |
| 18 | H | 130 | 130 |
| 19 | I | 713 | 356 |
| 20 | I | 0 | 356 |

In this experiment, a Coriolis density meter (densitometer) was incorporated in a recirculation loop mode to accurately track the addition of ingredients and density changes during the batch process, in the manner described above. The water was initially added to the mixing tank and the densitometer measured the water density. Each ingredient was added in the form of solid powder. Once each ingredient was added into the mix, each ingredient passed through the meter and caused a spike in the density of the batch, shown by line 300 in FIG. 6, due to the Coriolis effect. Each spike or sharp increase in density corresponds to the addition of the ingredient into the mix. Each spike is labeled with a letter that corresponds to the ingredient that caused the spike. Once a well-dispersed mixture is present, the density reading levels off to steady-state (shown by the plateau regions between each spike in FIG. 6). Moreover, the concentration of each ingredient was calculated based on density measurements.

Additionally, the densitometer measured the drive gain of the batch. The drive gain, shown by line 400 in FIG. 6, indicates the presence of multiple phases in the batch. As shown in FIG. 6, the drive gain spiked at the time each ingredient was added to the batch, then decreased to at or near the original value. The decrease in drive gain following the spike indicates the solid powders have fully dissolved into the liquid.

As shown in FIG. 6, the drive gain increased following the addition of Ingredient G, then leveled off to a drive gain value higher than the original. This is due to the fact that Ingredient G trapped air, which affected the density readings. Drive gain remained at a slightly elevated level following the addition of Ingredient G, even after the batch was fully mixed. Despite the elevated drive gain, it was still possible to detect changes in drive gain following the addition of Ingredient H and I.

Figure 7:
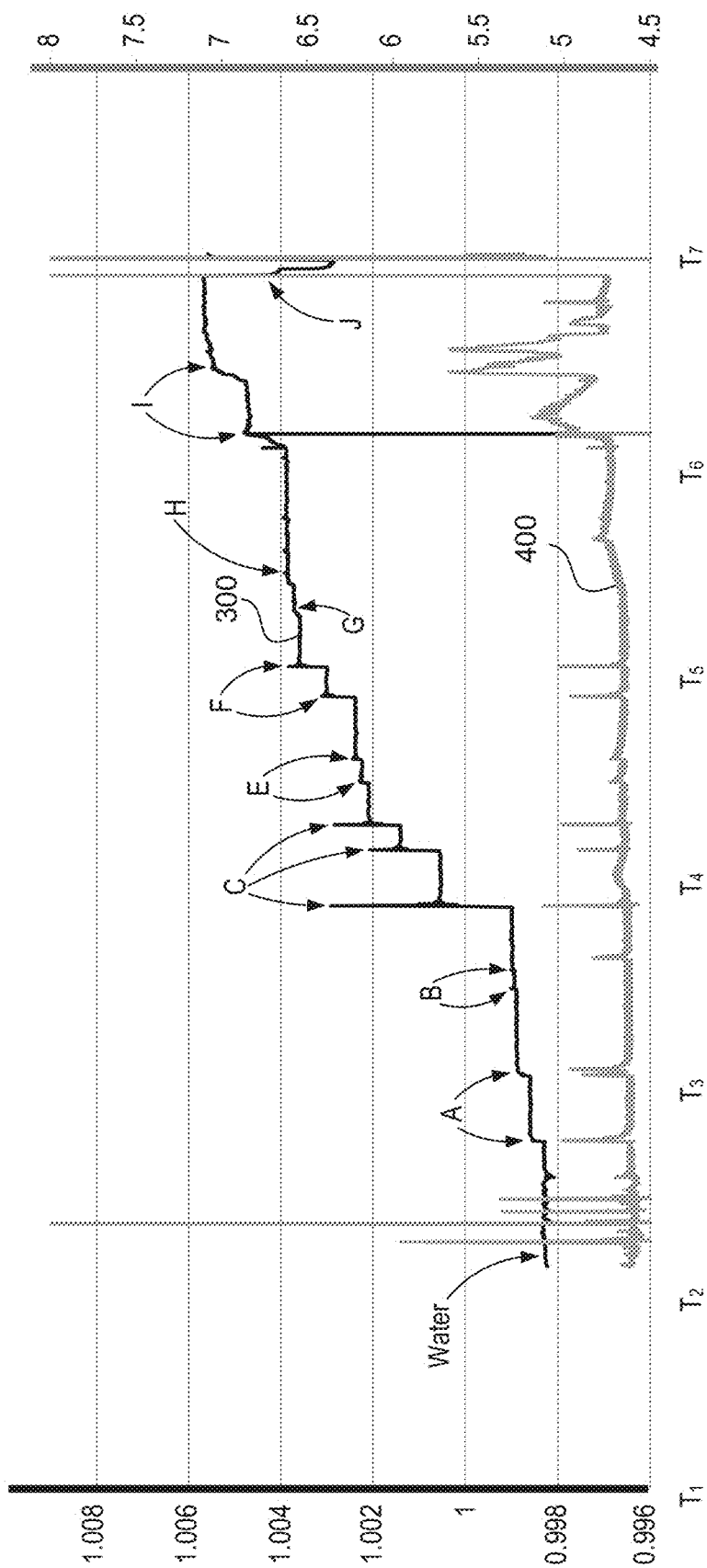
FIG. 7 shows density and drive gain measurements over time for another exemplary batch.

During Batch 2 Ingredient D was not added, Ingredient C was added 3 times (compared to 2 times in Batch 1), and Ingredients G and I were each added 2 times (compared to 1 time each in Batch 1). FIG. 7 shows the density and drive gain of Batch 2 over time. The left y-axis shows density (g/cm$^3$), the right y-axis shows drive gain, and the x-axis shows time (seconds). Line 300 represents the density of the batch over time, and line 400 shows drive gain over time.

FIG. 3 shows an expanded view of FIG. 7 at the times when Ingredient C was added during Batch 2, with line 300 representing density (g/cm$^3$) and line 400 representing drive gain. As shown in FIG. 3, line 300 shows three spikes, each corresponding to the addition of Ingredient C. Similarly, the drive gain spikes at each of those times. After the initial spike for each addition of Ingredient C, line 300 reached a steady state at an increased density. Line 400 shows an increased drive gain following the addition of Ingredient C followed by a reduction back to the original drive gain from before Ingredient C was added. This indicated Ingredient C was initially undissolved in the batch, and after a short time became fully dissolved in the liquid. As discussed relative to Example 1, FIG. 7 shows a similar increase in drive gain during Batch 2 following the addition of Ingredient G.

In addition to Ingredient A-I, following the addition of Ingredient I to Batch 2, gas was added to the batch to test the density and drive gain measurement. The addition of gas (labeled "J" in FIG. 7) caused a noticeable spike in drive gain and a sharp decrease in density.

Figure 8:
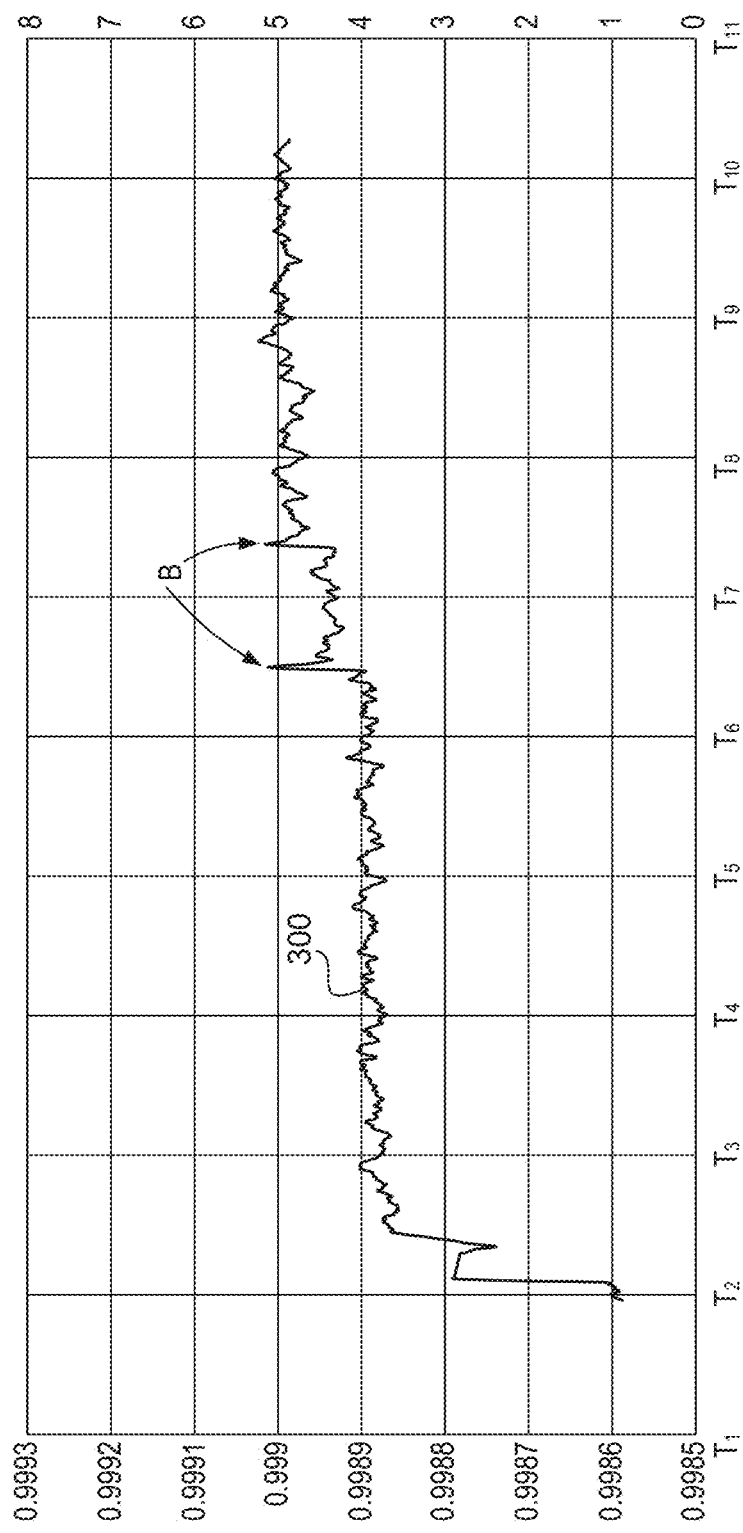
FIG. 8 shows more detailed density and drive gain measurements for another specific time range for the batch shown in FIG. 7.

FIG. 8 shows an expanded view of FIG. 7 at the times when Ingredient B was added, with line 300 representing density (g/cm$^3$). Ingredient B makes up less than 0.02% of the total mass of the batch, but FIG. 8 illustrates that it is possible to detect minor changes in density caused by the addition of a very small mass of ingredients. FIG. 8 shows two peaks, labeled "B," that correspond to the two stages of addition of Ingredient B to the batch.

Figure 9:
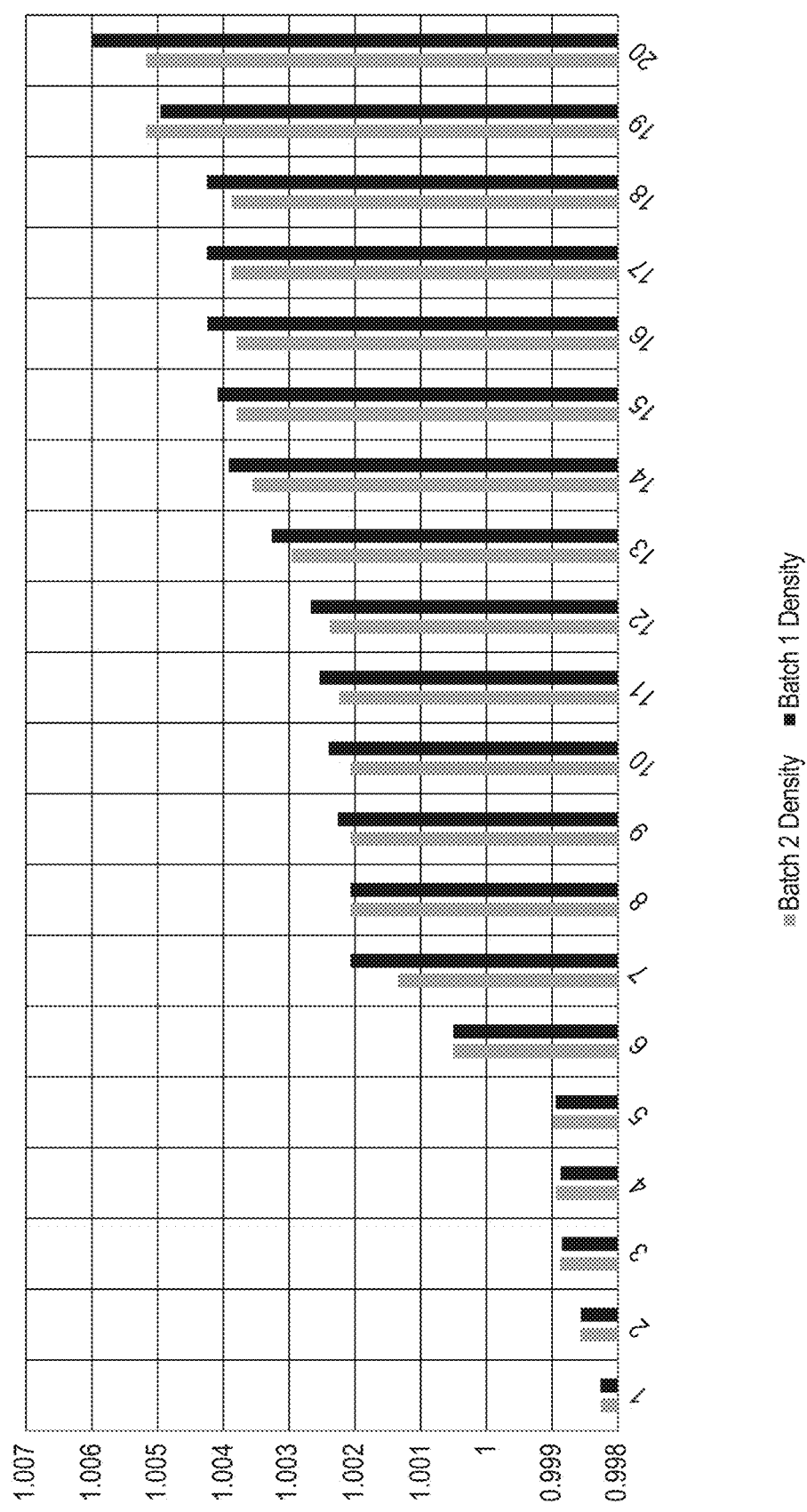
FIG. 9 shows a side-by-side comparison of the density of the batch shown in FIG. 6 to the density of the batch shown in FIG. 7.

The measurement results of Batch 1 and Batch 2 can be used to illustrate how the densitometer can be used to establish a standardized density chart that represents target recipe data and ensure quality of subsequent batches. FIG. 9 shows a comparison of the densities in Batch 1 and Batch 2. The y-axis shows density (g/cm$^3$). Each bar represents the density of the batch after an ingredient has been added. For example, in Batch 1, Ingredient C was added in two stages, so bars 6 and 7 each correspond to an addition of Ingredient C.

FIG. 9 shows the same density at points where the ingredient addition sequence of Batch 1 matches Batch 2, but shows deviations in density when the addition sequence differed between Batch 1 and Batch 2. For example, the same amount of Ingredient C was added to both Batch 1 and Batch 2, but Ingredient C was added in two stages in Batch 1 and three stages in Batch 2. Because of the difference in addition sequence, the density at 7 is lower for Batch 2 than Batch 1 because not all of Ingredient C had been added to Batch 2. Comparing Batch 1 to Batch 2, differences between the batches can be readily determined. So, if Batch 1 was the standardized recipe, looking at FIG. 9, it could be readily determined when and by how much Batch 2 deviated from the standard.

Example 2

In another experiment, offline density measurements were taken of Batch 2 using an offline density measurement instrument, and the results of the offline density measurements were compared to the in-line density measurements.

The in-line density device used to measure density for Batch 1 and Batch 2 had a density accuracy of ±0.1 kg/m$^3$ (±0.0001 g/cm$^3$) and a density repeatability of ±0.02 kg/m$^3$ (±0.00002 g/cm$^3$). For offline density measurements, an Anton Paar DMA 5000M was used. The device had a density accuracy of ±0.005 kg/m (±0.000005 g/cm$^3$), a density repeatability of ±0.001 kg/m$^3$ (0.000001 g/cm$^3$).

Figure 10:
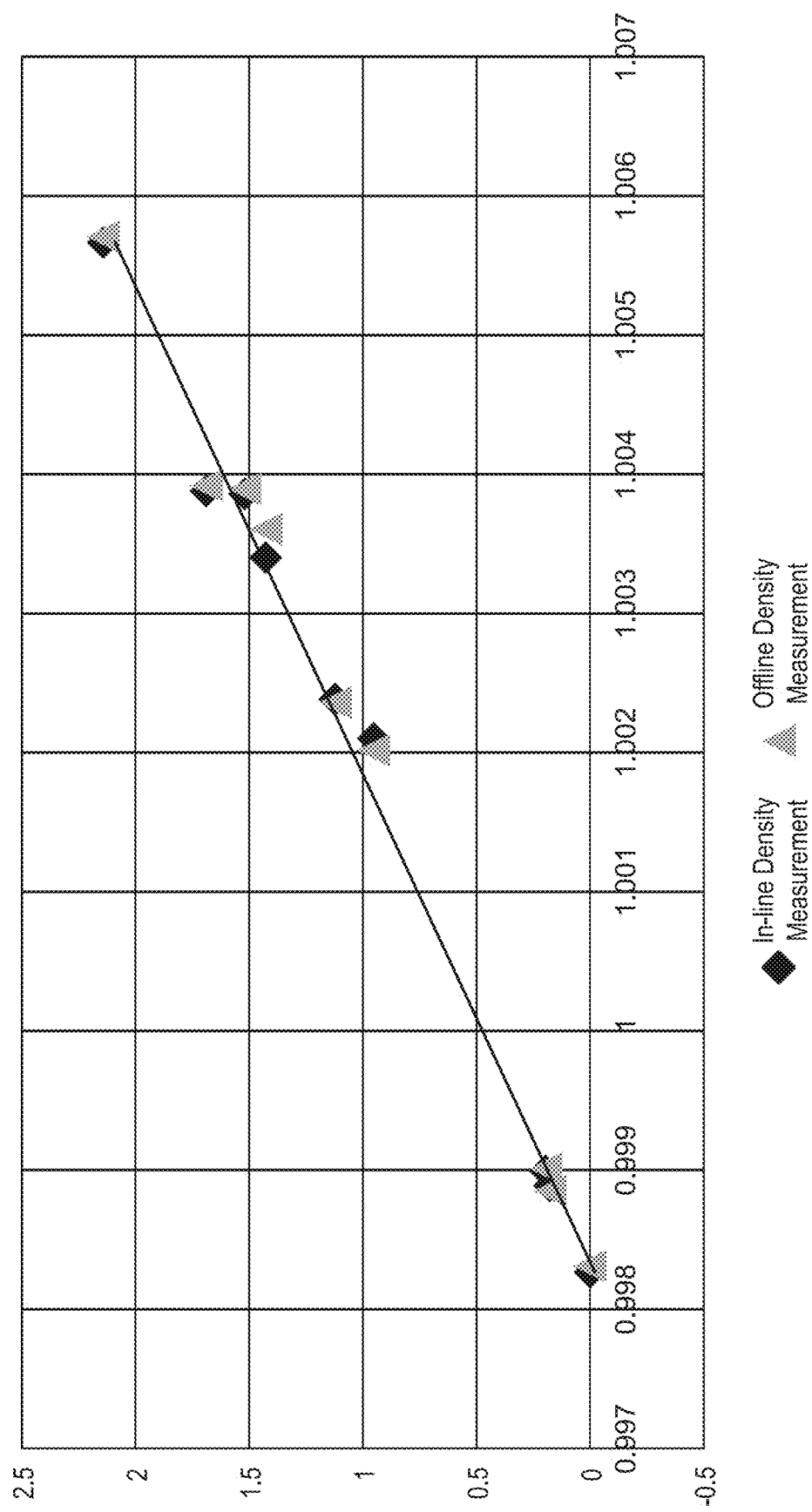
FIG. 10 shows a comparison of density measurements completed by the in-line density device to an offline density device.
Figure 11:
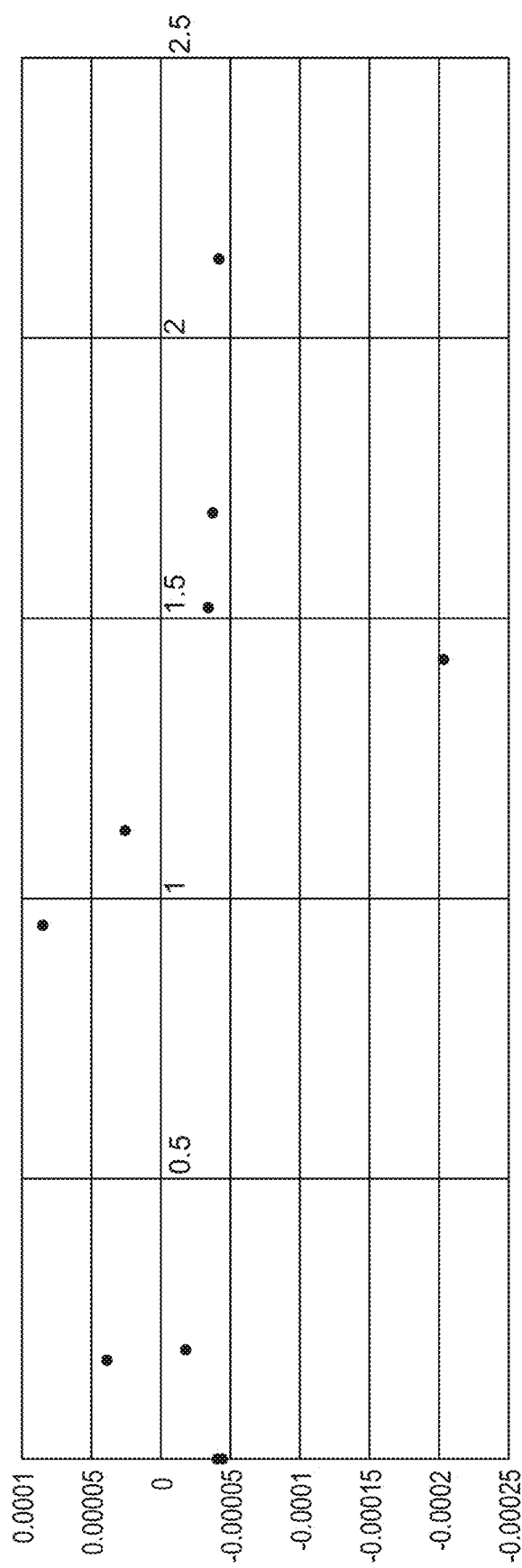
FIG. 11 shows data points that represent the difference in measurements between the in-line density device and the offline density device.

FIG. 10 graphically shows the comparison of in-line density measurements to offline density measurements. FIG. 10 shows concentration (% mass ingredient) on the y-axis and density (g/cm$^3$) on the x-axis. As shown in FIG. 10, the in-line density measurements were similar, and nearly identical to, the offline density measurements, indicating the in-line density measurement method is at least as effective as offline density methods. FIG. 11 illustrates the difference between in-line density measurements and offline density measurements of Batch 2. As shown in FIG. 11, the y-axis shows density (g/cm$^3$) and the x-axis shows mass concentration. The data points shown in FIG. 11 represent the difference between the measurements of the in-line density device and the offline density device. FIG. 11 illustrates that the in-line density device measurements have very little error.

As used herein, the term "fully mixed" or "well-mixed" means the batch has been mixed so that the ingredients have dissolved or mixed into the batch such that all of the components in the mixture are fully dispersed. For example, if a solid powder is added to the batch, the batch will be "fully mixed" or "well-mixed" when the powder is no longer visible in the batch. Additionally, the batch may be "fully mixed" or "well-mixed" if the fluctuations in density (e.g., as measured by the densitometer) are less than or equal to +5%.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for tracking the quality of a beverage produced according to a batch process, comprising:
    adding a first ingredient to water to form a batch;
    mixing the batch until the first ingredient is fully mixed;
    adding a second ingredient to the batch;
    mixing the batch until the second ingredient is fully mixed;
    measuring the density of the batch in real time using an in-line density device;
    monitoring changes in density of the batch;
    detecting deviations from a target recipe based on the changes in density; and
    correcting for any detected deviations from the batch process in real time.

2. The method of claim 1, wherein:
    the detecting step comprises comparing the density measurements to density values of the target recipe; and
    the correcting step comprises matching the density to the density values of the target recipe data by addition of further ingredients.

3. The method of claim 2, wherein the measuring step, monitoring step, and detecting step are performed by software in communication with the in-line density device.

4. The method of claim 3, wherein the software provides an automatic alert if the detecting step determines that the density of the batch has deviated from the density of the target recipe by at least 1%.

5. The method of claim 1, further comprising repeating the adding and mixing steps for five more ingredients.

6. The method of claim 5, wherein the density is measured after each ingredient is added.

7. The method of claim 1, further comprising measuring mass flow rate in real time.

8. The method of claim 1, wherein the detecting step is performed after the addition of each ingredient.

9. The method of claim 1, wherein the in-line density device comprises a densitometer.

10. The method of claim 1, further comprising, after the addition of the first ingredient and before the addition of the second ingredient:
    measuring a drive gain of the batch using the in-line density device;
    determining whether the batch is fully mixed based on the measured drive gain; and
    mixing the batch until the drive gain indicates the batch is fully mixed.

11. The method of claim 1, wherein the density is measured continuously.

12. The method of claim 1, wherein:
the ingredients are added sequentially, and
the density is measured after each ingredient is added.

13. A method of detecting inhomogeneity in a batch process for producing a beverage, comprising:
mixing a first ingredient into a batch for forming the beverage;
measuring drive gain of the batch in real time using an in-line density device;
monitoring changes in the drive gain;
detecting inhomogeneity in the batch based on the changes in the drive gain; and
correcting for any detected inhomogeneity in real time before the addition of a second ingredient.

14. The method of claim 13, wherein the correcting step comprises mixing the batch until the drive gain indicates full dissolution of the first ingredient into the batch.

15. The method of claim 13, wherein the measuring step, monitoring step, and detecting step are performed by software.

16. The method of claim 15, wherein:
the software automatically performs the correcting step if the detecting steps detect inhomogeneity, and
the correcting step comprises mixing the batch until the batch is homogenous.

17. The method of claim 13, wherein changes in the drive gain correspond to changes in a property of the batch, and wherein the property is one or more of an amount of air bubbles, an amount of undissolved solids, an amount of agglomeration, or viscosity.

18. The method of claim 1, further comprising:
adding a recirculation loop to a batch system before adding the first ingredient; and adding the in-line density device to the recirculation loop,
wherein the batch is formed in the batch system.

19. The method of claim 18, wherein the in-line density device is a densitometer.

20. The method of claim 18, wherein measuring the density of the batch in real time comprises:
circulating the batch contained in the batch system through the recirculation loop, and
measuring the density of the batch with the in-line density device.

* * * * *